United States Patent [19]

Cerrato

[11] 4,341,240

[45] Jul. 27, 1982

[54] BEER TAP CONSTRUCTION

[75] Inventor: Vincent J. Cerrato, Pomona, N.Y.

[73] Assignee: Vending Components, Inc., Hackensack, N.J.

[21] Appl. No.: 118,203

[22] Filed: Feb. 4, 1980

[51] Int. Cl.³ .............................................. F16K 15/04

[52] U.S. Cl. ............................... 137/533; 137/533.11; 222/400.7

[58] Field of Search ....................... 137/533.11, 533.13, 137/539, 533; 222/400.7

[56] References Cited

U.S. PATENT DOCUMENTS

| | | | |
|---|---|---|---|
| 1,756,225 | 4/1930 | Thurstensen | 137/533.13 X |
| 2,682,281 | 6/1954 | Ecker | 137/533.13 |
| 4,180,189 | 12/1979 | Zurit et al. | 222/400.7 |
| 4,228,927 | 10/1980 | Beyens et al. | 222/400.7 X |
| 4,286,622 | 9/1981 | Ninomiya et al. | 137/533.11 |

FOREIGN PATENT DOCUMENTS

| | | | |
|---|---|---|---|
| 2500253 | 7/1976 | Fed. Rep. of Germany | 137/539 |
| 1416352 | 9/1965 | France | 137/533.11 |
| 553939 | 1/1957 | Italy | 137/533.11 |

*Primary Examiner*—Robert J. Spar
*Assistant Examiner*—Frederick R. Handren
*Attorney, Agent, or Firm*—Hopgood, Calimafde, Kalil, Blaustein & Judlowe

[57] ABSTRACT

This invention is an improvement in tavern fittings that are used for dispensing beer from kegs, and it is for the purpose of simplifying the construction of the equipment and the dispensing of beer more efficiently. The construction lends itself to easier cleaning of beer dispensing equipment as the result of more convenient disassembly for cleaning and subsequent reassembly. One feature of the invention insures the closing of the keg valve, even though the tavern fitting is so dirty that it sticks in the open position when the tavern fitting of the prior art is moved into position to close the keg fitting valve.

5 Claims, 7 Drawing Figures

FIG. 1a,

BEER TAP CONSTRUCTION

BACKGROUND AND SUMMARY OF INVENTION

Beer kegs and the like have valves that can be operated by attaching tavern fittings to the kegs. The tavern fittings are detachable from the kegs and from the keg valves when the kegs are in storage or in transit.

Tavern fittings which connect the kegs with the beer faucets at a bar are auxiliary equipment that may be considered a permanent part of the bar. There are a wide variety of tavern fittings and they must be compatible with the valves in the kegs that the tavern obtains from the brewery from which the beer is purchased.

This invention is an improvement in the tavern fittings shown in patent application, Ser. No. 868,492, filed Jan. 11, 1978 (now U.S. Pat. No. 4,180,189). The check valve of the fitting referred to is in a chamber with the downstream side closed by a threaded hose connection which is permanently secured with a sleeve through which beer flows from the tavern fitting to the beer hoses that lead to faucets at the tavern counter. The hose connection requires machine work for its manufacture at its lower end to provide cross channels that add to the cost of the patented fitting and that cannot be cleaned as easily as the construction of the present invention.

This invention provides a simplified construction in which the sleeve that contains the check valve is of one-piece construction with the threads for the tavern hose on the outside of the sleeve through which the beer flows. The movement of the check valve away from its seat is controlled by a spring that is tapered and coiled with its largest coil in a groove in a wall of the sleeve and with the smallest convolution of the spring in contact with the check valve.

Alternatively a bushing that fits into the sleeve with a slide fit and with an integral flange that contacts with the end face of the sleeve is cast with the necessary cross passages in the end face which limits movement of the check valve.

A probe in the tavern fitting is pushed down by cams operated by a manually-operated handle in said patent, and returns to normal position by pressure of a spring which may not have sufficient force if the beer line has not been cleaned for a long time. This invention provides positive movement of the probe in both directions and the operator can feel the resistance to movement.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1*a* is a sectional view through the improved tavern fitting of this invention and shows the way in which the tavern fitting is connected with a keg fitting through which the beer is withdrawn from a beer keg;

DESCRIPTION OF PREFERRED EMBODIMENT

Figure 1B:
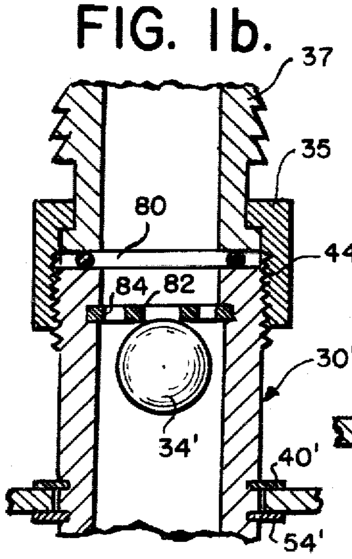
FIG. 1*b* shows a modified construction at the top of the structure shown in FIG. 1*a;*
Figure 1B:
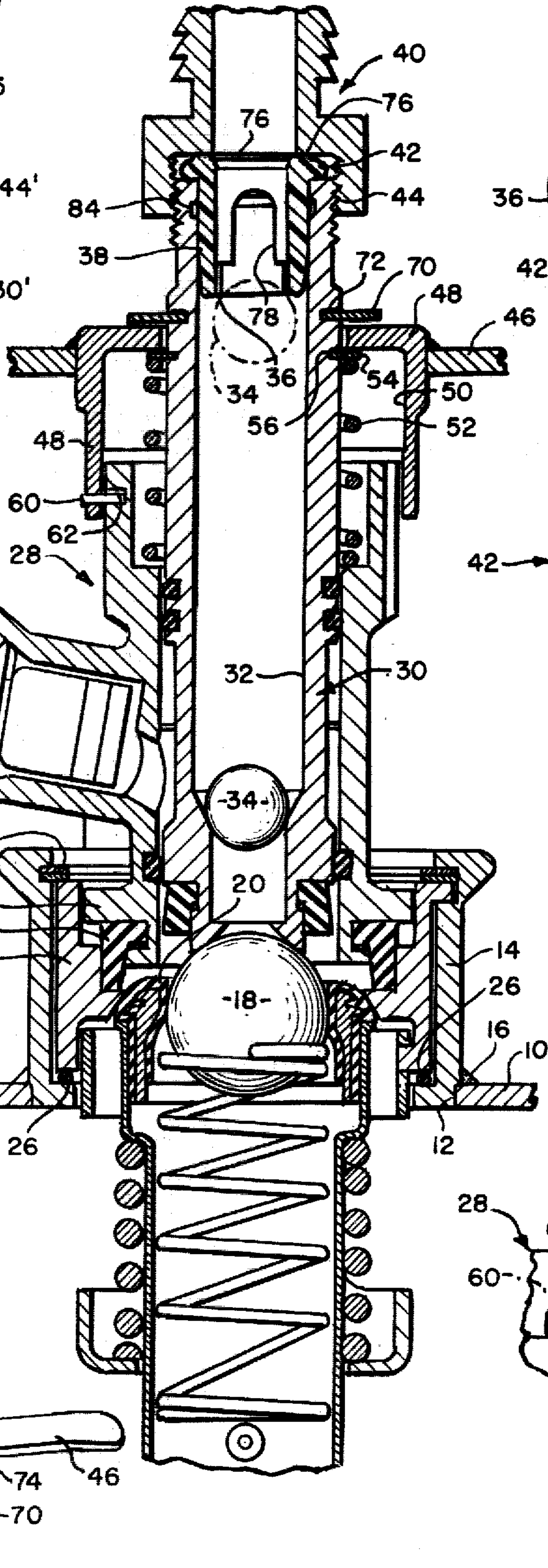

FIG. 1*a* shows a portion of a beer keg 10 with an opening 12 into which a neck 14 is inserted and secured to the keg 10 by welding 16. A spherical valve 18 closes against a seat 20 which is held in the neck 14 by a frame 22 held in the neck 14 by split rings 24 that hold the frame 22 against sealing rings 26. The construction thus far described is conventional.

A tavern fitting designated generally by the reference character 28 connects with the keg fitting neck 14 by a bayonet type connection 29 grooves in the frame 22 and holds a sealing ring 31 in contact with the frame 22. The bayonet lock 28 thus secures the tavern fitting to the neck 14 rigidly in accordance with conventional practice, and a probe 30 is located in the housing of the tavern fitting 28 and has a passage 32 through which beer flows from the keg when the valve 18 is opened by the probe moving down and displacing the valve 18 from its seat 20.

There is a check valve 34 in the passage 32 and the passage has a reduced diameter at its lower end to provide a seat for the check valve 34, as shown in FIG. 1*a*. When gas is flowing from the keg toward the upper end of the probe 30, the check valve 34 will move upward above its seat; and the check valve 34 may move to the position shown in dotted lines in FIG. 1*a* but it cannot block the upward flow because it is restrained by protuberances 36 at the lower end of a bushing 38 which fits into the upper end of the probe 30. Details of this bushing 38 will be described in connection with FIGS. 3 and 4.

A tubular sleeve-discharge fitting or hose connector 40 has a face which contacts with the upper end of the bushing 38 to clamp a flange 42 at the end of the bushing 38 against a top face of the probe 30. Threads on the hose fitting 40 screw over complimentary threads 44 to secure the hose fitting 40 to the upper end of the probe 30.

A handle 46 has a center hub 48 which has a cylindrical chamber 50 that opens downwardly and fits over the upper end of fixed housing of the tavern fitting 28. A coil spring 52 surrounds the probe 30 within the chamber 50. This spring 52 seats against a surface of the fixed structure of the tavern fitting 28 at the lower end of the spring and is held under pressure by a washer 54 which is a slit ring that snaps into a groove 56 in the circumference of the probe 30.

Downward movement of the handle 46 and its hub 48 is obtained by rotating the handle, causing a cam follower 60 to follow a cam track 62 (FIG. 5) formed in the outside surface of the stationary wall of the tavern fitting 28. Rotation of the handle 46 and hub 48 moves the cam follower 60 along the cam track 62 and causes the handle to move downwardly until it reaches the position shown in dotted lines at the end of the cam track shown in FIG. 5.

Figure 5:
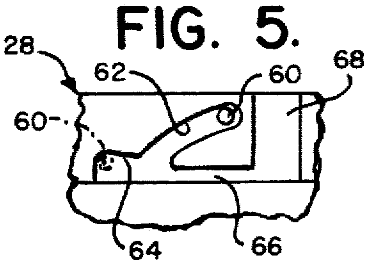
FIG. 5 is a diagram showing the way in which the cam followers on the top handle of FIG. 1*a* operate to depress the probe when the upper handle is rotated.

Any time that the downward pressure on the handle 46 is release (FIG. 1*a*) the cam follower 60 will be held against the top of the cam track 62 (FIG. 5). There is a rise 64 at the end of the cam track 62 so that any time that the cam follower 60 moves beyond the downwardly sloping track 62 and enters the rise at the end of the cam track, the upward spring pressure will hold the cam follower 60 in the dotted line position shown in FIG. 5. This maintains the probe in its lowermost position and keeps the valve 18 (FIG. 1*a*) open so that beer can flow from the keg.

If the handle 46 and hub 48 are to be removed from the fixed part of the tavern fitting 28, the handle 46 and hub 48 are held down against the pressure of the spring 52 so that the cam follower 60 (FIG. 5) can be moved along the straight portion 66 until the handle has rotated far enough to bring the cam follower 60 to vertically extending flat area 68 on the side of the fitting 28 so that the cam follower 60 can be removed from the cam track.

In tavern fittings of the prior art, where the probe was depressed by cam structure such as shown in FIG. 5, there was no positive way for compelling the probe to rise when the follower 60 was not lifted by the spring under the handle that operated the cam mechanism. If the inside of the tavern fitting were gummy from inadequate cleaning, the probe would stay in a depressed condition and hold the key valve open. If a tavern fitting were disconnected from a keg with the probe still in a depressed position which held the keg valve open, then lifting of the tavern fitting on which the handle had been turned into position to close the keg valve, would cause beer to spray out of the keg as the tavern fitting was disconnected from the keg without knowing that the probe was holding the keg valve open. This caused beer to spray out between the tavern fitting and the open keg valve with waste of beer and extensive cleanups.

Figure 2:
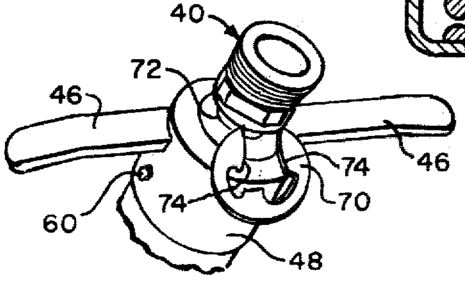
FIG. 2 is an isometric view of the top of the structure shown in FIG. 1*a* and illustrating the way in which a split washer is inserted into a circumferential groove in the upper part of the probe shown in FIG. 1*a;*

FIG. 2 shows an improvement which prevents accidents caused by disconnecting the tavern fitting from the keg when the tavern fitting probe is still holding the keg valve open because the probe spring 52 did not raise the probe when the handle 46 was rotated into position where the probe would be raised under normal operating conditions. A split washer 70 is shown in FIG. 2 in the process of being inserted into a slot 72. FIG. 1*a* shows the washer 70 after insertion into the slot 72 and the width of the split washer 70 is sufficient to extend over the top of the hub 48 of the handle 46 so that when the cam track raises the handle, the probe 30 is forced to rise with the handle so that when the handle reaches the position where the keg valve should be closed it will always be closed because the probe will be at the same position as it would be if the spring 52 raised the probe. The washer 70 has three faces 74 which contact with the inner face of the groove 72 and other portions of the washer can bend as necessary when inserting and removing the washer from the groove 72. This expedites disassembly of the tavern fitting when necessary for cleaning.

Figure 3:
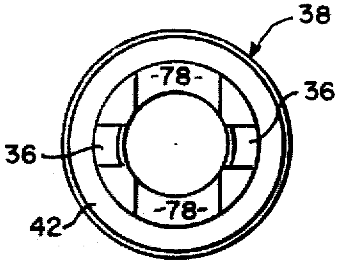
FIG. 3 is a bottom elevation of the bushing which fits into the top of the prove in FIG. 1*a;*
Figure 4:
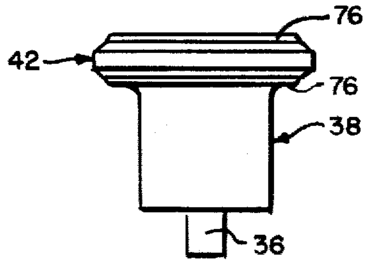
FIG. 4 is a side elevation of the bushing shown in FIG. 3.

FIGS. 1*a*, 3 and 4 show the preferred construction for preventing the check valve 34 from unduly obstructing the free flow of beer through the probe 30 on its way to the hoses or pipes leading to the tavern faucets. At the upper end of the probe 30 the bushing 38, preferably fits into the probe with a pressed fit and the flange 42 is preferably a molded fitting of suitable plastic material. The flange 42 is preferably made with circumferential beads 76 on the upper and lower surfaces of the flange 42. When the flange is clamped between the hose fitting 40 and the upper end surface of the probe 30, these beads contact with flat annular surfaces so that the areas of contact are reduced and the unit pressure at the beads is proportionately increased so that the beads serve as seals to prevent leakage of beer at the connection between the hose fitting and the threads 44 of the probe. The sidewalls of the bushing 38 have open areas 78 which extend for most of the height of the bushing to provide more open area for the flow of beer.

FIG. 1*b* shows a probe 30' with threads 44' screwed into complimentary threads of a hose fitting retainer 35 and with a packing washer 80 compressed between the upper end of the probe 30' and a confronting face of a beer hose nipple 37.

Figure 6:
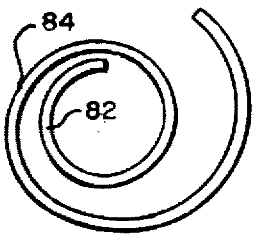
FIG. 6 is a plane view of the spring of FIG. 1*b* before being inserted into the groove.

In order to limit the upward movement of the check valve 34' in the probe 30', there is a spring clip 82 which has a circumferential top loop which fits into a groove 84 in the inside surface of the probe 30'. The spring 82 is flat and is shown in FIG. 6 before being inserted into the groove 84. The spring clip 82 can be removed from the groove 84 and the check valve 34' also removed when cleaning the beer line, just as the bushing 38 can be removed from the probe in FIG. 1*a* when cleaning the line.

In the construction shown in FIG. 1*b*, the groove 84 is preferably located about ⅛ inch from the upper end of the probe 30'. This makes the removal of the spring clip convenient and removal of the check valve 34' also convenient.

The preferred embodiments of the invention have been illustrated and described but changes and modifications can be made and some features can be used in different combinations without departing from the invention as defined in the claims.

What is claimed is:

1. An outlet fitting for a beer keg or the like including in combination a sleeve having a passage with a discharge end through which the beer is discharged from the keg, a check-valve element in the sleeve, a seat in the sleeve against which the check valve closes to prevent back flow of beer through the fitting toward the keg, a retainer bushing flanged at one end and having its other end received in the sleeve passage at the discharge end of the sleeve, the extent of such reception being to the point of flange abutment with said discharge end of the sleeve, the part of the bushing which extends into the sleeve having a passage for the flow of beer from the keg, and the bushing having protuberances at its said other end, said protuberances having interference abutment with the check-valve member to effectively prevent the check-valve member from entry into the other end of the bushing, and a tubular sleeve-discharge fitting having a counterbore sized and configurated for removable circumferential overlap and threaded engagement with the outer surface of the discharge end of the sleeve, the counterbore of said sleeve-discharge fitting being characterized by an annular flange-engaging bottom wall in radial overlap with the end of the sleeve.

2. The outlet fitting of claim 1, in which each axial side of the bushing flange is characterized by an integral radially narrow circumferentially continuous axially protruding rib having sealing engagement with the discharge end of the sleeve and with the bottom wall of the counterbore, respectively.

3. The outlet fitting of claim 1, in which the flanged bushing is a molded plastic part.

4. The outlet fitting of claim 1, in which the passage from the seat to the discharge end of the sleeve is a straight cylindrical bore, at least to the limit of bushing reception therein.

5. The outlet fitting of claim 1, in which said check-valve element is a ball.

* * * * *